United States Patent [19]

Johnson

[11] Patent Number: 5,713,306
[45] Date of Patent: Feb. 3, 1998

[54] FELINE PLAYGROUND SYSTEM

[76] Inventor: Arnold B. Johnson, 55 Eve La., Levittown, N.Y. 11756

[21] Appl. No.: 533,871

[22] Filed: Sep. 26, 1995

[51] Int. Cl.$^6$ .................................................. A01K 1/00
[52] U.S. Cl. ........................... 119/706; 119/708; 119/485
[58] Field of Search ................................. 119/28.5, 706, 119/707, 708, 485

[56] References Cited

U.S. PATENT DOCUMENTS

| | | | |
|---|---|---|---|
| 3,595,209 | 7/1971 | Parker | 119/706 |
| 4,177,761 | 12/1979 | Bellochi, Jr. | 119/708 X |
| 4,790,265 | 12/1988 | Manson | 119/706 |
| 5,339,770 | 8/1994 | Haffner | 119/708 |
| 5,577,466 | 11/1996 | Luxford | 119/706 |

FOREIGN PATENT DOCUMENTS

| | | | |
|---|---|---|---|
| 2628637 | 12/1977 | Germany | 119/706 |
| 8101728 | 12/1981 | Netherlands | 119/706 |

*Primary Examiner*—Robert P. Swiatek
*Assistant Examiner*—Elizabeth Shaw

[57] ABSTRACT

An accessory for domestic cats that provides scratching, climbing, resting, playing, sleeping and observation facilities for the house kept cat that is designed and engineered as a "knockdown" assembly that can easily and readily be erected or disassembled. The main assembly is comprised of several sections and sizes of cylindrical shapes that are attached in-line end to end via internal fasteners that are threaded to prevent accidental separation. Once the sections are fully assembled a drop-in pressure maintaining device that is preassembled is installed at the top end together with a mobile multiple toy holder. The largest diameter assembly serves as the "house" and the roof serves multi-purpose, one, as an observation deck, the other, as an elevated play deck from where the cat can reach and play with toys attached to the mobile multiple toy holder. The bottom of the "house" serves as a mounting for the anchor that suspends other toys between the "house" and the floor. This accessory has been designed to enable more than one cat to utilize it simultaneously, if there is need. The full assembly when installed between the floor and ceiling of a room is self supporting and is afforded stability through the constant application of pressure derived from the pressure maintaining device.

1 Claim, 2 Drawing Sheets

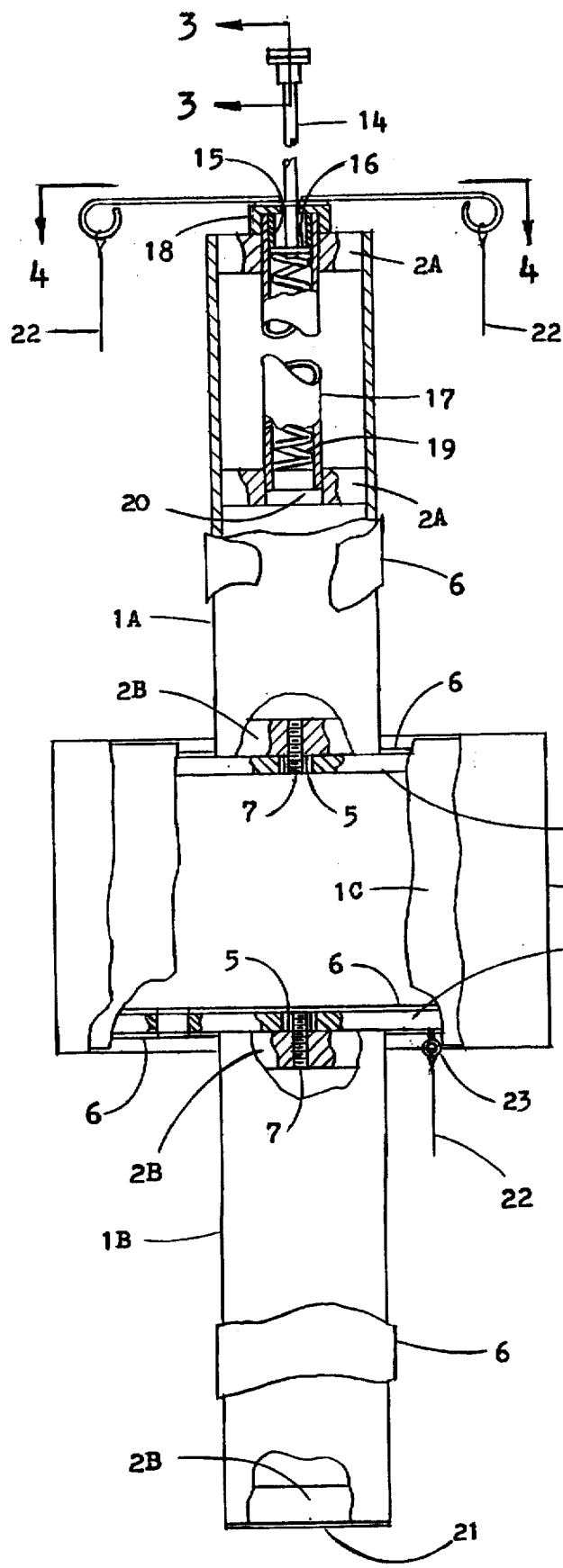
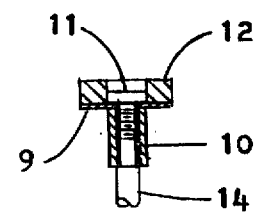
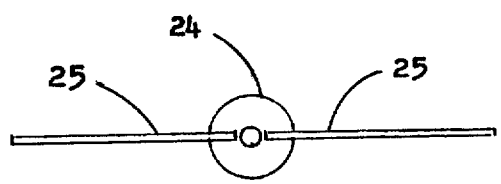
FIG. 3
FIG. 4
FIG. 1

FELINE PLAYGROUND SYSTEM

BACKGROUND OF THE INVENTION

1. Field of the Invention

This invention relates to domestic feline accessories most commonly called a "scratching post", a "cat bed", a "cat seat", a "sleeping enclosure", and various "cat toys", more particularly this combines all these singular items into one.

2. Description of the Prior Art

U.S. Pat. No. 3,595,209 issued to Parker describes an exercise pole assembly for cats. The pole extends between the floor and ceiling of a room using linear sections of soft round wood held in line with dowels and horizontal platforms that may be inserted between the sections, a base plate (for floor contact), a top plate (for ceiling contact), and a spring having a bias force exerted between the top pole section and the top plate that is contacting the ceiling.

U.S. Pat. No. 3,479,991 issued to Lichtenberger describes an animal climbing structure consisting of a plurality of tubular sections having plugs on each end, one a male the other a female, oriented vertically on top of one another and held together by plugging in the sections. The structure is placed between the floor and ceiling and removedly fixed by a threadly extendable and retractable plate located at the bottom of the structure.

U.S. Pat. No. 3,479,990 issued to Crow describes a cat tree consisting of a tubular structure extending between a floor and ceiling. The tube consists of a plurality of sections, in this case three, with the middle tube section having crimped ends. The crimped ends fit into the tubular ends of the top tube section and the bottom tube section to releaseably secure the three tubes together in a vertical orientation. The bottom tube section is attached to a platform, which sits on the floor and acts as a base. A plunger is located in the top tube section, and is longitudinally extendable therefrom. The plunger extends to engage the ceiling, and is fixed at any desired extended position by a set screw.

Netherlands Patent No. NL 8101-728 issued to Klever describes a cat climbing pillar having externally threaded sections of tube coupled together using internally threaded flanged couplings. The flanges then support cantilevered sections that are attached to the flanges with fasteners. The uppermost coupling flange supports a horizontal section that mounts a chamber and the top most tube section passes through this chamber to engage this coupling. The opposite end of this this tube section is mounted a plunger to apply pressure to the ceiling. The bottom of this assembled pillar a plate (base plate) is attached utilizing a similar flanged threaded coupling.

U.S. Pat. No. 4,177,761 issued to Bellocchi describes a pet playhouse consisting of eight flat sides and shaped like a Shoe box, supported by rubber-like feet affixed to the exterior lowermost largest surface therof. The side opposite contains a hole large enough for the cat to pass through and also is the mounting surface for a post that a toy is attached to via a spring like wire. This same side slides off to expose the interior of the container.

U.S. Pat. No. 4,339,770 issued to Haffner describes an exercise and amusement toy for a dog or other pet including a supported umbrella shaped top or dome with toys suspended by resilient lines, such as ropes or cables from the rim of the dome. The dome is supported and held upright by an intermediate elongated standard member which in turn is supported by a baseplate.

U.S. Pat. No. 4,790,265 issued to Manson describes a combined scratching post and exercise center utilizing a flat board forming the base that supports a pair of post longitudinally spaced and in line that extend vertically upwardly therefrom and parallell to each other with a cylindrical cross bar fixedly mounted between the posts at the end opposite the base.

The following is a critique of each of the aforementioned patents and is addressed directly in comparison to the preferred embodiment.

U.S. Pat. No. 3,595,209 Unlike Parker,

The preferred device requires no baseplate (floor plate) that protrudes to encumber the floor presenting 8 safety hazard to humans.

The preferred device uses no top plate (ceiling plate) that unnecessarily detracts from it.

The preferred device uses no post sections of wood that would require fumigation of the wood in order to protect the homeowner or animals from infestation from insects or parasites living in the wood, or from splinters to human or cat.

The preferred device uses no dowels for connecting the wood post sections that are subject to shrinking or swelling, loosening or tightening depending upon the temperature and humidity in the building causing the section joints to loosen and the entire post to waver or tighten and not be able to disassemble.

The preferred device uses tubular sections to drastically reduce the weight for ease of handling and shipping.

U.S. Pat. No. 3,479,991 Unlike Lichtenberger,

The preferred device requires no baseplate (floor plate) that protrudes to encumber the floor presenting a safety hazard to humans.

The preferred device requires no special cast, molded, or machined parts.

The preferred device does not use a threadly extendable and retractable plate at the bottom that is subject to loosening from vibration and cause a failure to remain in an upright position and therefore collapse.

U.S. Pat. No. 3,479,990 Unlike Crow,

The preferred device does not attach to a bottom platform to encumber the floor presenting a safety hazard to humans.

The preferred device does not require a set screw to fix the position of the plunger to keep it in contact with the ceiling, making it ineffective due to temperature and humidity changes in the building increasing or decreasing the distance between the floor and the ceiling.

The preferred device does not require special machine tools to crimp the tube ends.

Netherlands Patent No. NL 8101-728 Unlike Klever,

The preferred device does not attach to a baseplate (floor plate) that protrudes to encumber the floor presenting a safety hazard to humans.

The preferred device does not require threaded tube sections.

The preferred device does not require specially molded or cast couplings having flanges and internal threads to connect the tube sections and support the platforms.

U.S. Pat. No. 4,177,761 Unlike Bellocchi,

The preferred device does not sit on the floor to encumber it producing a safety hazard to humans.

U.S. Pat. No. 4,339,770 Unlike Haffner,

The preferred device is specifically for cats.

The preferred device does not sit on the floor to encumber it producing a safety hazard to humans.

The preferred device does not require a dome to be molded, vacuum formed, or a metal spinning to be made to suspend the toys.

U.S. Pat. No. 4,790,265 Unlike Manson.

The preferred device does not require a base to sit on the floor to encumber it producing a safety hazard to humans.

The preferred device does not have two short upright posts attached to a base plate producing a safety hazard to humans.

No prior art provides the benefits attendant with the present invention. Additionally, the prior patents and commercial techniques do not suggest the present inventive combination of component elements arranged and configured as disclosed and claimed herein.

SUMMARY

In view of the foregoing disadvantages in the prior art the present invention achieves its intended purposes, objects, and advantages through a new, useful and unobvious combination of component elements, with the use of a minimum number of functioning parts, at a reasonable cost to manufacture, and employing only readily available materials.

It is a known natural habit that cats are more comfortable resting in high places and/or in enclosed spaces, and that house kept cats will scratch objects like furniture to sharpen their claws to enhance their ability to climb or catch and hold moving objects (prey), since they are naturally hunters. They are also known to be very territory protective, and therefore have a propensity to constantly observe their surroundings.

The present invention provides a cat a place to scratch, climb, exercise, rest, observe, and play with mobile toys at multiple levels in one device that has the attributes of a tree that supports an elevated shelter like structure with sleeping capabilities and mobile toys, eliminates prior singular accessories commonly called a "cat toy", a "scratching post", a "cat bed", a "cat seat", and various forms of "sleeping enclosures" into this one accessory that eliminates the safety hazard to humans that is imminent when multiple accessories as described are singular and on the floor to encumber it.

This invention has been designed and engineered so the pet owner can make the final assembly and the installation without any tools.

This invention is so designed to be affordable and portable and that when placed in any room it becomes a conversation piece for the home.

BRIEF DESCRIPTION OF DRAWINGS

FIG. 1 is a side elevational view of the assembly of the present invention in a normal usable attitude with sections cut away to show details.

FIG. 3 is a vertical cross-sectional view taken between arrowheads 3 and 3 showing the arrangement of/and parts required.

FIG. 4 is a sectional view looking down between arrowheads 4 and 4 showing the arrangement of/and parts required.

DESCRIPTION OF THE PREFERRED EMBODIMENT

FIG. 1 Embodiment

Figure 2:
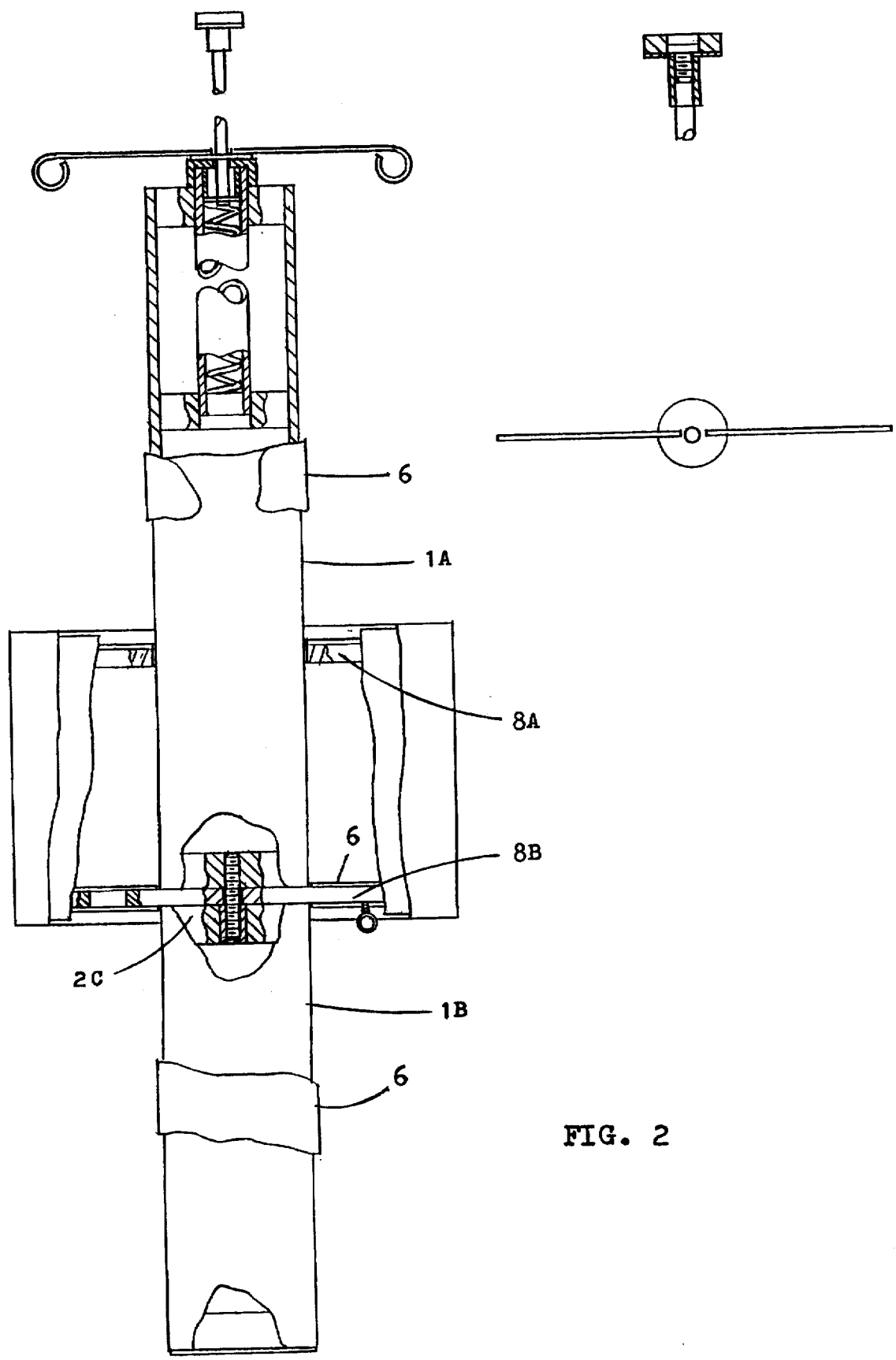
FIG. 2 is an alternate embodiment

Description of the embodiment of both upper and lower cylindrical tubular sections:

The upper cylindrical tube (1A) and lower cylindrical tube (1B) are of the same material and diameter. Disks (2A) and (2B), are close fitted to the inside diameter of (1A) and (1B). Disk(s) (2A) are centerbored to an aperature closely fitting the outside diameter of cylindrical tube (17). Disk(s) (2B) are centerbored to an aperature appropriate for installation of a threaded male connector (7). One disk (2A) is located in tube (1A) as shown to stabilize the lower end of tube (17), the other disk (2A) and both disks (2B) are installed flush in the ends of tubes (1A) and (1B) and may be affixed by nails or the like. Threaded male connectors (7) are then installed into disks (2B). Tubes (1A) and (1B) are covered independently end to end with a woven pile-like material (6) that may be affixed by nails, adhesive or the like.

Description of the embodiment of the Shelter and Observation Deck

This section is many times larger in diameter in respect to the upper and lower cylindrical tubes (1A) and (1B). The cylindrical tube (1C) may also be of the same or similar material as tubes (1A) and (1B), and likewise the ends are cut square. Disk(s) (8A) and (8B) are close fitted to the inside diameter of (1C) and are centerbored to an aperature appropriate for installation of a threaded female connector (5) that match threads of male connector (7) used in tubes (1A) and (1B). The disk(s) (8A) and (8B) are then installed with a setback from the end and perpendicular to the wall of tube (1C) and may be attached by nails or the like. Cutouts are made through disks (8A) and (8B) large enough for a cat to pass through. Upon installation the cutout of disk (8A) shall be offset from the cutout of disk (8B). The top side of disk (8A) and both sides of disk (8B) shall be covered with a woven pile-like material (6) and the entire tube (1C) outer wall as well. This material may be attached with nails, adhesive or the like.

FIG. 2 Alternate Embodiment

Description of the embodiment of both upper and lower cylindrical tubular sections The upper cylindrical tube (1A) and lower cylindrical tube (1B) are of the same material and diameter. Disks (2A), (2B), and (2C) are close fitted to the inside diameter of (1A) and (1B). Disks (2A) are centerbored to an aperature closely fitting the outside diameter of cylindrical tube (17). Disk (2B) is centerbored to an aperature appropriate for installation of a threaded male connector (7). Disk (2C) is centerbored to an aperature appropriate for installation of a female connector (5) that match the threads of male connector (7). One disk (2A) is located in tube (1A) as shown to stabilize the lower end of tube (17), the other disk (2A) and both disks (2B) and (2C) are installed flush in the ends of tubes (1A) and (1B) and may be affixed by nails or the like. Threaded male connector (7) is installed into disk (2B) as shown. Tubes (1A) and (1B) are covered independently end to end with a woven pile-like material (6) that may be affixed by nails, adhesive or the like.

Description of the embodiment of the Shelter and Observation Deck

This section is many times larger in diameter in respect to the upper and lower cylindrical tubes(1A) and (1B). The cylindrical tube (1C) may also be of the same or similar material as tubes (1A) and (1B), and likewise the ends are cut square. Disk(s) (8A) and (8B) are close fitted to the inside diameter of (1C). Disk (8A) is centerbored with an aperature close fitted to tube (1A). Disk (8B) is centerbored with an aperature close fitted with male connector (7). The disks (8A) and (8B) are then installed with a setback from the end and perpendicular to the wall of tube (1C) and may be attached with nails or the like. Cutouts are made through disks (8A) and (8B) large enough for a cat to pass through. Upon installation the cutout of disk (8A) shall be offset from the cutout of disk (8B). The top side of disk (8A) and both sides of disk (8B) shall be covered with a woven pile-like material (6) and the entire tube (1C) outer wall as well. This material may be attached with nails, adhesive or the like.
Description of the embodiment of the Mobile Multiple Toy Holder The Mobile Multiple Toy Holder is comprised of a disk (24) having a diameter near equal to the diameter of cap (18) and a centerbore aperature close fitted to place over tube (14) and having two arms (25) each formed with preferably a loop at one end and the other affixed to disk (24), the other arm affixed directly in-line and opposite the first, by whatever process is required for the material chosen and the arms (25) shall not extend outwardly beyond the diameter of cylinder (1C).

Upon installation, to the loops of each arm (25) attach string or the like (22) and suspend toys between arms (25) and disk (8A). And lastly, install screw eye (23) to the bottom of disk (8B) and attach a string or the like (22) and suspend toys between disk (8B) and the floor.

For use on resilient floor tile, ceramic or marble flooring or the like anti-skid material (21) may be applied within the surface area of the lower disk (2B) with the appropriate hardware or adhesive.

Description of the embodiment of the Pressure Maintaining Device

This cylindrical tube (17) is of a smaller diameter than that of tubes (1A) and (1B). A capplug (20) closes one end and may be attached by pins, screws, adhesive or the like. A smaller cylindrical tube (14) is affixed with a disk (16) that is close fitted to the inside diameter of tube (17) at one end and the opposite end is fitted with male threads. A spring (19) is next inserted into tube (17), followed by the assembled tube (14) and disk (16). A cylindrical tubular spacer (15) that has a close fit outside diameter with tube (17) and a larger diameter than tube (14) is passed over tube (14) where upon a cap (18) having a centerbore closely fitting tube (14) is placed over tube (14) and over tube (17) and attached with pins, screws, adhesive or the like.

The pressure foot assembly is comprised of a disk (9) with a centerbore aperature closely fitting the thread diameter of the flanged bushing (11) that matches tube (14) that is passed through disk (9) and engages tube (10) having female threads that also matches tube (14). Tube (10) and flanged bushing (11) are then permanently fastened together by staking, adhesives or the like. A disk (12) of resilient material having a centerbore aperature slightly larger than the flange of bushing (11) and with the outside diameter of disk (9) is then attached to disk (9) by adhesive or other means. The pressure foot assembly being comprised of tube (10) is removable from tube (14) to facilitate the attachment of the Mobile Multiple Toy Holder where upon thereafter it is reattached.

I claim:

1. A feline playground system for house kept cats providing resting, playing, end exercise facilities comprising:

(a) a vertical column capable of being assembled and installed between a floor and ceiling of a room without the use of tools, said vertical column being comprised of a plurality of tubular sections one above the other and of varying diameters, said tubular sections being fitted internally with centerbored disks fitted with threaded fasteners to enable the assembly of the various diameters of said tubular sections;

(b) one of said tubular sections having a largest diameter being an elevated shelter, said elevated shelter having internally fitted centerbored disks being the floor and roof of said elevated shelter, said centerbored disks having openings to allow entry and exit of a cat, the floor of said elevated shelter also serving to anchor suspended toys and the roof of said elevated shelter serving as an observation deck and play platform;

(c) a pressure maintaining device used to hold said vertical column stable between the floor and the ceiling of a room, said pressure maintaining device comprising a spring encased within a tubular section installed within the uppermost tubular section of said vertical post and having an exposed piston shaft that has an end fitting comprised of resilient material that is releasably fixed to permit the attachment of a mobile multiple toy holder;

(d) a mobile multiple toy holder comprising wire-like arms extending outwardly in opposite directions from a central mounting and bearing place that is fitted to rotate around the said piston shaft of the pressure maintaining device, said arms serving to anchor suspended toys above said observation deck and play platform;

(e) said tubular sections being fitted with woven pile-like material externally and with said elevated shelter else being fitted with said woven pile-like material internally;

(f) the lowermost of said tubular sections being fitted with anti-skid material on one end.

* * * * *